March 23, 1937.  G. J. SKVOR  2,074,945
CONSTRUCTION AND IMPROVEMENT OF A SMOKEHOUSE
FOR SMOKING, CURING, AND PROCESSING MEATS
Filed March 20, 1933   2 Sheets-Sheet 1

Inventor.
George Jerome Skvor

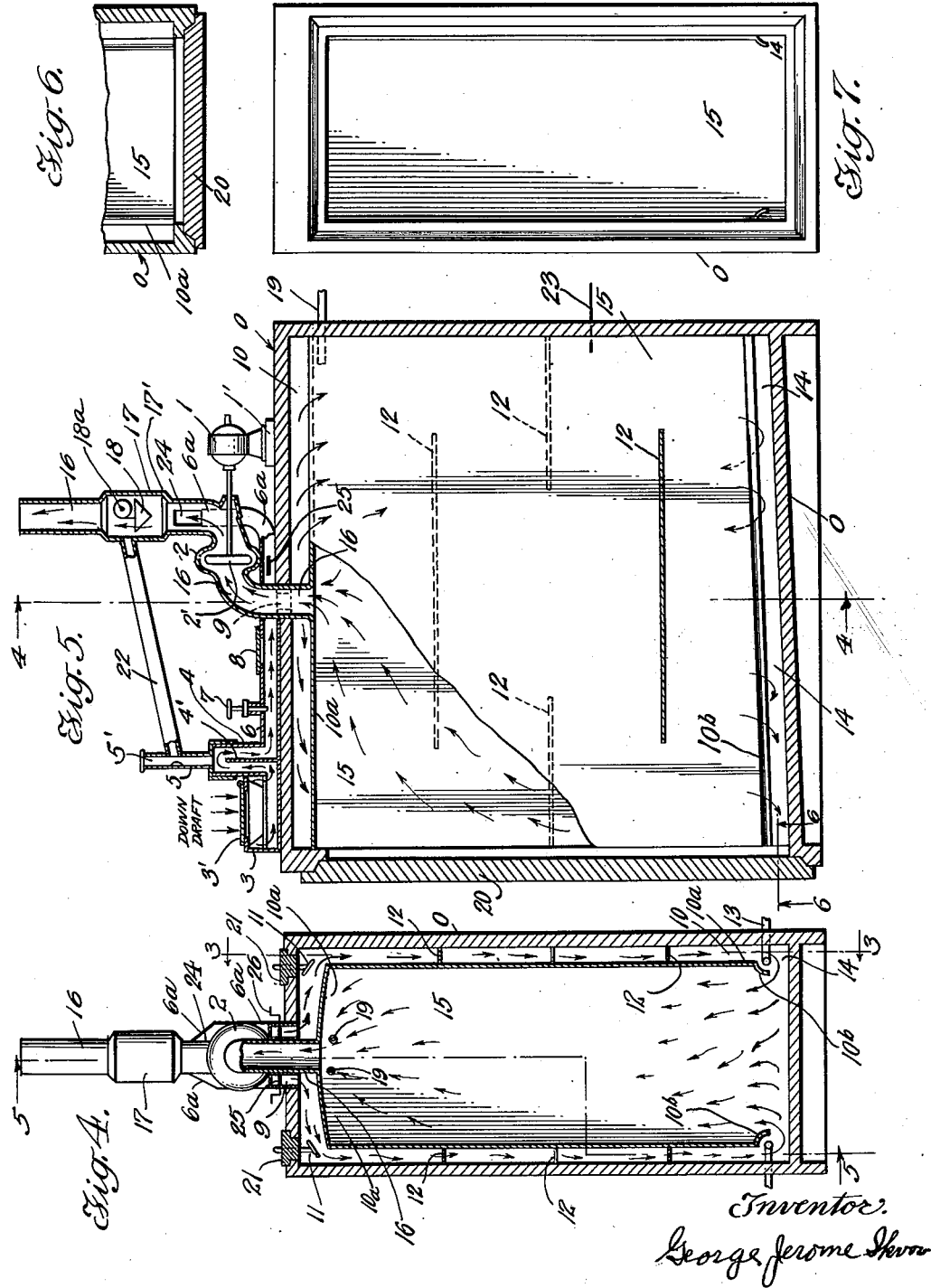

Patented Mar. 23, 1937

2,074,945

UNITED STATES PATENT OFFICE 2,074,945

CONSTRUCTION AND IMPROVEMENT OF A SMOKEHOUSE FOR SMOKING, CURING, AND PROCESSING MEATS

George Jerome Skvor, Boise, Idaho

Application March 20, 1933, Serial No. 661,833

21 Claims. (Cl. 99—259)

My invention is a novel improvement in smoke houses, in which meats or the like are to be smoked, cured, or processed; also a novel process for smoking meats or other products; and the principal objects of the invention are, to provide means in a smoke house for producing and maintaining an even and controlled heat and smoke in every part of the smoke house; also to provide an exhaust stack for smoke, heat, and moisture; said stack having a valve, and means below the valve for returning the smoke and heat which have risen in the exhaust pipe to the smoke house; also to provide a smoke house in which the chamber has double walls and a double ceiling; and to provide means for causing an even circulation of heat and smoke in the chamber, the heat being furnished by automatically controlled heaters placed between the double walls and ceiling. Other minor objects of the invention will be hereinafter set forth.

In actual operation I have found that the meat smoked in my novel smoke house has a richer flavor and higher color than produced by methods heretofore used. Because of the even circulation of the heat and smoke the product is more evenly smoked. It is well known that varying temperatures cause shrinkage in the bulk of the meat; but by my invention a controlled temperature is effected by reason of which the shrinkage is greatly lessened. The control of the smoke, with no pockets, gives control of color. Weather conditions do not interfere with the process, as by making the air dry, the moisture and temperature may be controlled under any weather conditions. I have found also that the time of smoking and processing is reduced approximately 25 per cent, that the cost of labor is reduced 25 per cent, in addition to the great saving in the consumption of hard wood used to produce the smoke and heat under former methods. In fact I effect a scientific control of the whole process and am able to produce thereby a standard and uniform product at all times.

I will explain the invention with reference to the accompanying drawings which illustrate one practical embodiment thereof, to enable others to adopt and use the same; and will summarize in the claims the novel features of construction, and novel combinations of parts, for which protection is desired.

In said drawings:—

Fig. 4 is a transverse section through the smoke house on the line 4—4, Fig. 5.

Fig. 5 is a longitudinal section through the smoke house on the line 5—5, Fig. 4.

Fig. 6 is a horizontal section on the line 6—6, Fig. 5.

Fig. 7 is a front elevation of the smoke house with the door removed; and

Fig. 8 is an enlarged detail.

Figure 1:
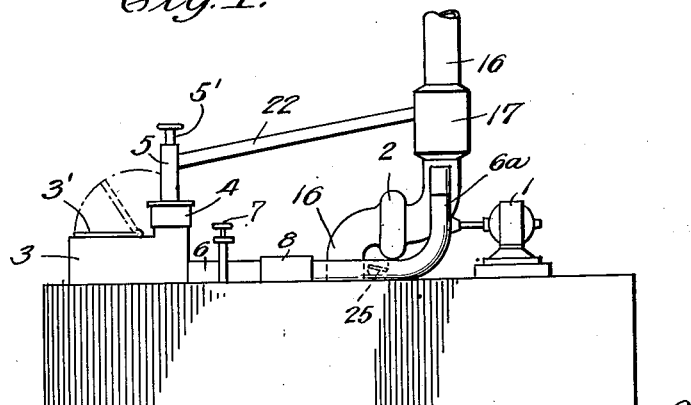
Fig. 1 is a side elevation of the upper portion of my novel smoke house.

As shown, the assembly includes an outer casing O of suitable design, preferably rectangular, including side, top, bottom and end walls, one of the latter being provided with an opening functioning as a door-frame for cooperation with a door 20 which may be hung in any desirable manner as by the use of hinges.

Within the outer casing O is arranged an inner casing 10a, which includes a top and two side walls spaced as at 10 from the corresponding walls of the outer casing, the inner casing extending the entire length of the outer casing, and abutting at each end against the faces of the end walls of the outer casing. The lower extremities of the side walls of the inner casing are flared inwardly as at 10b and terminate above the bottom of the outer casing whereby a passageway is provided under the entire length of the longitudinal walls of the inner casing connecting the meat receiving chamber 15 of the inner casing with the space between the inner and outer casings. A plurality of horizontal baffles 12 are positioned in staggered relation between the spaced walls for the purpose of directing the flow of the smoke heat and air passing between the spaced walls and for producing a suitable mixture of smoke and heated air in the channels, passages, and chamber 15.

Positioned adjacent the flared lower extremities 10b of the inner casing walls are lower electric heaters 13; and upper electric heaters 11 are disposed in the space formed between the top walls of the inner and outer casings, the upper heaters 11 being preferably supported by removable blocks 21 fitted within openings in the top wall of the outer casing, and said heaters 11 projecting inwardly to extend longitudinally between the inner and outer casings, same being disposed substantially midway between the corners formed at the junctions of the top and side walls of the casings, as shown in Fig. 4.

A thermostat 23 is included in the system for the purpose of automatically controlling the heaters 11 and 13 to regulate temperature of the heat and smoke. In the present instance the heaters 11 and 13 are illustrated as of the electric type and the control of the current to these electric heaters will be regulated by the necessary thermostatic controls conventional in assemblies of this type.

At the upper rear end of the assembly is a pair of pipes 19—19 (Figs. 2, 4 and 5) for the purpose of directing steam and water into the chamber 15 of inner casing in which the products to be smoked are placed.

Extending through the top walls of the inner and center outer casings, preferably at the approximate center thereof, is a stack 16 for the chamber 15, and adjacent the opening formed in the outer casing O for stack 16 are ports 9 which open into the conduit 6 hereinafter described. Mounted upon the top of the casing is a smoke pot or generator 3 of suitable design same preferably including a draft regulator 3' in the form of a hinged plate which is adjustable to regulate the down draft. Adjacent the smoke generator 3 is a deflector chamber 4 in which is positioned a baffle 4' to cause an upward and downward flow of smoke from the smoke generator 3. A flue 5 extends upwardly from chamber 4 and connects with a by-pass pipe 22 communicating directly with the enlarged portion 17 of the stack 16. A sleeve 5' within flue 5 controls the draft through by-pass 22.

Figure 2:
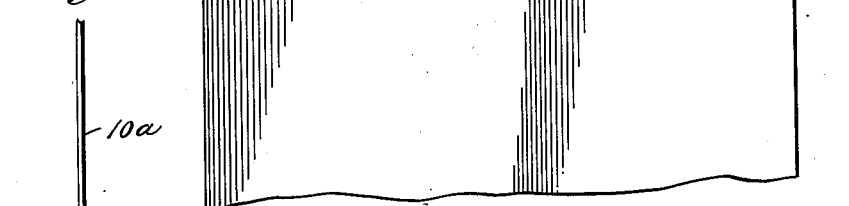
Fig. 2 is a top plan view thereof.
Figure 3:
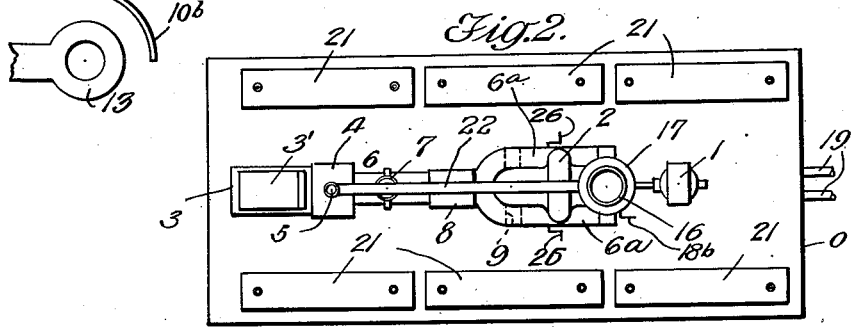
Fig. 3 is a broken section on the line 3—3, Fig. 4, showing the arrangement of upper heaters.

Conduit 6 extends from the deflector chamber 4 along the top of the outer casing O to a point adjacent the stack 16, and at this point conduit 6 is bifurcated as shown in Fig. 2, and the branches 6a diverge outwardly to embrace the ports 9, and the branches 6a further are bent upwardly and communicate with the stack 16 through ports 24 disposed above an enlarged portion 2 which forms the casing for the impeller 2' but below the point of connection of by-pass 22 with the stack. A valve 7 is located in the conduit 6; and in the bifurcated branches 6a valves or dampers 25 are provided same being operated by cranks 26. On conduit 6 between valve 7 and the stack is a sleeve 8 adapted to open or close an opening in the conduit to the atmosphere. The impeller or fan 2' housed in the enlarged portion 2 of stack 16 is preferably rotated by an electric motor 1 mounted upon a base 1' supported by the outer casing O.

The enlarged portion 17 of stack 16 is provided with a valve seat 17' for a conical valve 18 disposed above the ports 24 for the conduit branches 6a, and valve 18 operates to close the lower portion of stack 16 below the point of connection of the by-pass 22 with the stack so that the operation of valve 18 will not affect the draft through the pipe 22 which is controlled by the sleeve 5'. Valve 18 is operated by a pulley or drum 18a rotated by a crank 18b as indicated in Figs. 2 and 5.

The operation of the smoke house is as follows: The meat products to be cured are placed within the treating chamber 15. The motor 1 driving the fan or impeller 2' is then started while the valves 7, and 18 are open, and the dampers 25 closed. Cold air is exhausted from chamber 15 by the impeller 2' while smoke from the smoke generator 3 is drawn over the baffle 4', through the conduit 6 past the open valve 7, through the sleeve 8, and down through the ports 9 into the space 10 between the walls of the casings. The smoke is thus drawn by suction past the upper electric heaters 11, down past the mixing baffles 12, and past the lower electric heaters 13, and out through the openings 14 and into the chamber 15 where the meat to be smoked has been placed.

For the purpose of fully processing the meat, after the smoke house is filled with smoke and heat the valve 18 is dropped onto its seat 17' to close the stack below the valve 18. The upper heaters 11 are shut off and the temperature automatically maintained for such time as is required by the thermostat 23. The valve 7 is then closed and the dampers 25 opened to open the conduit branches 6a, and as the valve 18 is closed the smoke products in stack 16 instead of being forced up the stack, are deflected through ports 24 into the conduit branches 6a, through the ports 9, and into the spaces 10, past the upper heaters 11, around the mixing baffles 12, and over the lower heaters 13, out through the openings 14 and thus returned to the chamber 15, the smoke following this same circuit as long as is required to complete the smoke circulating treatment.

After the circulating treatment has been completed and while the stack 16 remains closed by the valve 18, the conduit 6 is closed by the valve 7, and the conduit branches 6a closed by the dampers 25. Steam is then turned into the chamber 15 through one of the pipes 19, and after such treatment by steam it may be cooled by a cold water spray through the other pipe 19. After steaming and cooling, while the valve 7 and dampers 25 are closed, the stack 16 is opened by raising the valve 18, and the sleeve 8 is then shifted on the conduit 6 to open the conduit 6 to the atmosphere. All the heaters 11 and 13 are then turned on, and the motor 1 started, and clear air is drawn by suction through the opening 8 the air taking the same course through ports 9 into space 10, past heaters 11 and 13, into chamber 15, and up through stack 16 as formerly described for the smoke. This operation circulates heated air in chamber 15 to carry off moisture from the meat through stack 16 to dry the product to any required degree.

It will be noticed that the utilization of the conduit portion 6a of the conduit 6 leading from the smoke generator 3 to produce a recirculation of the smoke does not in any way affect the operation of the smoke generator, the draft from which is controlled by the top damper 3', and the sleeve 5' controlling the by-pass 22 from the flue 5. The valve 7 which is disposed between the smoke generator 3 and the ports 9, may be partially or entirely closed. If partially closed, there will be a constant feeding of fresh fumes from the smoke generator into the smoke circuit or cycle heretofore described. The position of the valve 7 will be determined by the required density of the smoke according to the product being treated and the nature of the process involved in the treatment.

I claim:

1. In a smoke house, a smoke generator; means for conducting smoke from the generator into the smoke house; means for circulating the smoke in the smoke house; an outlet stack for the smoke house; a valve in said stack; a flue connecting the smoke generator and stack above the valve; and means for returning the smoke in the stack to the smoke house when the valve is closed.

2. In combination with a smoke house as set forth in claim 1, means for heating the smoke in the smoke house; and means for automatically controlling the heat.

3. In combination with a smoke house as set forth in claim 1, baffle means for controlling the flow of smoke in the smoke house to prevent formation of pockets.

4. In a smoke house, a double walled chamber having discharge openings through the inner walls; a smoke generator; means for conducting smoke from the generator to the space between the double walls, means for circulating the smoke in the chamber; an outlet stack for the chamber; a valve in said stack; a flue connecting the smoke generator and stack above the valve; and means for returning the smoke in the stack to chamber when the valve is closed.

5. In combination with a smoke house as set forth in claim 4, means for heating the smoke between the double walls; and automatic means for controlling the heat.

6. In combination with a smoke house as set forth in claim 4, means between the double walls for controlling the flow of smoke to prevent formation of pockets.

7. In a smoke house, a double walled chamber having openings through the inner walls near their lower ends; a smoke generator; means for conducting smoke from the generator to the space between the double walls, means for circulating the smoke in the chamber; an outlet stack for the chamber; a valve in said stack; a flue connecting the smoke generator and stack above said valve; and means for returning the smoke in the stack to the space between the double walls when the valve is closed.

8. In combination with a smoke house as set forth in claim 7, heaters between the double walls; and automatic means for controlling the heat.

9. In combination with a smoke house as set forth in claim 7, series of baffles between the double walls for controlling the flow of smoke to prevent formation of pockets.

10. In a smoke house; a stack; an impeller in said stack; a smoke generator; a duct leading from the generator and discharging into the smoke house; a valve in said stack above the impeller; and a branch leading from the stack below the valve and discharging into the smoke house.

11. In a smoke house, a double walled chamber having openings therein in the inner wall; a stack for said chamber; an impeller in said stack; a smoke generator; a valved duct leading from the generator and discharging between the double walls; a valve in said stack above the impeller; and a valved branch leading from the stack below the valve and discharging between the double walls.

12. In combination with a smoke house as set forth in claim 11, a valved opening in said duct to the atmosphere between the valve of the duct and the chamber.

13. In a smoke house, a double walled chamber having openings through the inner walls near their lower ends; a stack for said chamber; an impeller in said stack; a smoke generator; a valved duct leading from the generator and discharging between the double walls at the upper end of the chamber; a valve in said stack above the impeller; and a valved by-pass leading from the stack below the valve and discharging between the double walls at the upper end of the chamber.

14. In a smoke house assembly including an outer casing, an inner casing spaced from the outer casing, openings formed near the bottom of said casing effecting communication between the space between the casing and the inner chamber, a smoke generator supported by the outer casing having a flue communicating with the space between said casings, an outlet pipe projecting upwardly from the inner casing, a by-pass connecting the smoke generator flue and the outlet pipe, a valve in said outlet pipe, a flue connecting said smoke generator and last mentioned pipe at a point above said valve, and means for circulating the smoke.

15. A smoke house, a smoke generator, a connection between the smoke house and generator, an outlet for said smoke house, an impeller in said outlet, a valve above said impeller, a by-pass connecting said smoke generator and said outlet at a point intermediate the valve and the impeller, and a second by-pass connecting said smoke generator and said outlet at a point above said valve.

16. A smoke house formed with spaced walls having communicating openings formed at the lower portion of the inner wall, a smoke generator positioned above the smoke house, a flue connecting the smoke generator with the space between the spaced walls, an outlet flue extending upwardly from the inner casing, a valve in said outlet flue, an impeller between the casing and the valve, and a by-pass between the smoke generator and the outlet flue.

17. In a smoke house, an external smoke generator, means for conducting smoke from the smoke generator to the smoke house; an outlet flue, means in said flue for drawing smoke from said generator to said smoke house, a control valve in said outlet flue, a pair of flues connecting said smoke generator in said outlet flue at each side of said valve, and control means for one of said flues.

18. In a smoke house assembly, a smoke generator, a flue, a communicating passage between said smoke generator and said smoke house adjacent said flue, an impeller for circulating the smoke in said smoke house and discharging same through said outlet flue, a by-pass connecting said smoke generator and said outlet, and means for returning the smoke from the outlet flue to the smoke house.

19. In a smoke house assembly, a smoke house; a smoke generator; a stack leading from the smoke house; an impeller in said stack controlling the passage of smoke therethrough; a conduit leading from the smoke generator and having an operative connection with the smoke house; a connection between the conduit and stack; a flue for the smoke generator; a by-pass connection between the stack and flue; a valve in said stack between the conduit connection and the by-pass connection; and valves for regulating the passage of smoke through the said conduit and connection.

20. In a smoke house assembly, a smoke house; a smoke generator having a down-draft regulator and a flue; a conduit leading from the smoke generator and provided with a direct connection with the smoke house; a valve in the conduit; a stack leading from the smoke house; means for circulating air in the assembly; a connection between the conduit and stack; a valve in said connection; a valve seat in the stack above said connection; a valve for said valve seat; and a by-pass connecting the smoke generator flue and said stack above the valve seat.

21. In an assembly as set forth in claim 20; the air circulating means being disposed in the stack below the valve seat.

GEORGE JEROME SKVOR.